US006233825B1

(12) United States Patent
DeGroot

(10) Patent No.: US 6,233,825 B1
(45) Date of Patent: May 22, 2001

(54) METALLIC STRINGED MUSICAL INSTRUMENT BODY AND METHOD OF MAKING SAID BODY

(76) Inventor: Richard J. DeGroot, 2170 Hope Ct., W. Lafayette, IN (US) 47906

( * ) Notice: Subject to any disclaimer, the term of this patent is extended or adjusted under 35 U.S.C. 154(b) by 0 days.

(21) Appl. No.: 09/365,745

(22) Filed: Aug. 3, 1999

(51) Int. Cl.$^{7}$ .......... B29D 17/00

(52) U.S. Cl. .......... 29/896.22; 84/291; 84/292; 84/290; 84/267

(58) Field of Search .......... 84/291, 267, 274, 84/275, 290, 294, 192, 292; 29/896.22

(56) References Cited

U.S. PATENT DOCUMENTS

| | | | | |
|---|---|---|---|---|
| 1,210,368 | * | 12/1916 | Wachwitz | 84/292 |
| 3,072,007 | * | 1/1963 | Burke | 84/267 |
| 3,602,627 | * | 8/1971 | McCammon | 84/725 |
| 3,771,408 | * | 11/1973 | Wright | 84/291 |
| 4,090,427 | * | 5/1978 | Kamán | 84/291 |
| 4,364,990 | * | 12/1982 | Haines | 428/218 |
| 4,616,548 | * | 10/1986 | Anderson | 84/743 |
| 4,873,907 | * | 10/1989 | Decker, Jr. et al. | 84/291 |
| 5,227,572 | * | 7/1993 | Cusack et al. | 84/383 A |
| 5,333,527 | * | 8/1994 | Janes et al. | 84/291 |
| 5,469,770 | * | 11/1995 | Taylor | 84/291 |
| 5,981,861 | * | 11/1999 | Van Delindu et al. | 84/743 |
| 6,087,568 | * | 7/2000 | Seal | 84/193 |

OTHER PUBLICATIONS

Solid State Physics by Ashcroft and Mermin Cornell University, 1976.*

* cited by examiner

*Primary Examiner*—Shih-Yung Hsieh

(57) ABSTRACT

Guitars have traditionally been manufactured from a variety of wood combinations to produce the best sound possible. The advent of modem day CNC machining has allowed for the construction of a hollow, lightweight, metallic stringed musical instrument body. This body can be constructed as a hollow body or solid body, as are traditional wood guitars, with or without the incorporation of sound amplification devices. This construction technique allows for unlimited body designs and modifications to produce a sound customized for the customer.

17 Claims, 5 Drawing Sheets

METALLIC STRINGED MUSICAL INSTRUMENT BODY AND METHOD OF MAKING SAID BODY

BACKGROUND OF THE INVENTION

1. Field of Invention

This invention generally relates to a hollow-metallic stringed musical instrument body and a method of making a metal stringed musical instrument body. For descriptive purposes the invention relates the construction of a guitar body but this is not intended to limit the scope of the invention for it can apply to any stringed musical instrument body such as violins, dulcimers, mandolins, basses, etc.

2. Related Art

Over the centuries designers of stringed musical instruments have experimented with the shape, size, and materials of construction for bodies for stringed musical instruments. This has led to the familiar sounds produced by violins, guitars, cellos and basses. The sound each of each being determined by the design characteristics.

Wood has been the material of choice to produce these instruments. The choicest of wood cuts encompassing all varieties of woods, (such as spruce, maple, basswood, rosewood, etc), have been used to obtain the highest quality of tone and pitch within each class of instrument. The manufacturers of these instruments are continually striving to produce the sound desired by the player and audience.

Unfortunately wood suffers from many distinct disadvantages which result in defects and undesirable tonal variations. These variations result from changes in the wood due to environmental conditions, the most prominent being temperature and humidity. These parameters can result in the swelling or shrinking of the wood resulting in unwanted tonal variations.

Fluctuations from wood lot to wood lot can also affect the final instrument body. These fluctuations include differing grain patterns and wood densities between trees. Differing techniques in cutting and drying procedures between mills also contribute to lot differences. Other shortcomings in wood are imperfections such as cracks and checks.

These disadvantages have led to the development of alternative materials of construction for stringed instrument bodies. These include U.S. Pat. No. 4,364,990, disclosing an invention for a graphite fiber/epoxy resin body and U.S. Pat. No. 5,905,219, describing a stringed musical instrument body constructed from polyurethane. These inventions resolve several of the problems associated with wood, but produce a sound unique to their construction which may or may not be desirable to the listening ear.

Although innovative, none of the above mentioned efforts to develop an alternative construction material for stringed instruments offer the sound and flexibility of the present invention. A metal body eliminates many of the problems associated with variation problems in wood lots and shortcomings of wood itself since metal stock is produced following strict quality control procedures.

The production method of this invention allows for near exact reproduction of the body. This ensures replication of the tonal qualities of the instrument body from instrument to instrument overcoming the tonal variations associated with wood.

The draw back to an all-metal guitar body is the weight of the metal. Excessive weight results in an undesirable product. This drawback has also been overcome with the present invention.

SUMMARY OF THE INVENTION

This invention describes a unique method of construction for an all-metal stringed instrument body. This invention overcomes the variation problems of wood through the use of metal. It also over comes the weight problem of metal through the use of lightweight alloys and by the incorporation of a hollow body.

The advent of modem day Computer Numeric Controlled (CNC) Machining (includes milling, EDM, and Laser cutting) has allowed for the production of a machined metal hollow body for a stringed musical instrument. This body is produced from several plates of metal that have been cored out using CNC machining until a thin skin (0.005–0.050" typical) is left as the body face. Thicker reinforcing ribs are left to provide support and add strength to the body. The components are laminated together to produce the desired lightweight hollow body.

Until recently such an approach would be economically unfeasible due to the exacting tolerances required. The advent of CNC (Computer numeric controlled) machining technology meets the exacting tolerances necessary to produce a body of acceptable sound and produce the body at a rate that will make it economically viable. The use of CNC machining technology allows for economic production of musical instrument bodies from a construction material of choice with unlimited design opportunities with exacting precision and accuracy, tolerances of less than 0.001" are easily obtained.

Modern CNC technology allows for the production of high precision, muti-component metal parts which, when assembled, produce a nearly seamless body. This construction allows for the manufactured body to behave as a single vibrating component. This attribute allows for very clean tonal qualities.

One embodiment of the invention is a stringed musical instrument body having a first face and a second face. The body includes a first plate having a metal skin with an inner surface and an outer surface. The outer surface of the skin forms the first face of the instrument body. The first plate also has metal reinforcing ribs extending from the inner surface of the skin. The reinforcing ribs are integral with the skin and form a seamless unit with the skin. The instrument body also includes a second plate fastened to the first plate and facing the inner surface. The second plate forms the second face of the stringed musical instrument body.

The first plate of the stringed musical instrument body may have a specific gravity between 5.5 and 1.5. The plate may be an alloy of aluminum, magnesium or titanium.

The stringed musical instrument body may also include a ring plate extending along a periphery of the first and second plates, interposed between them. One of the ribs may extend around a periphery of the first plate and form an outer wall of the instrument body. Screws may connect the first and second plates.

The second plate may have a second metal skin with an inner surface and an outer surface, wherein the outer surface of the second skin forms the second face of the stringed musical instrument body. In that case, the second plate has second metal reinforcing ribs extending from the inner surface of the metal second skin. Those reinforcing ribs are integral with the second skin and form a seamless unit with the skin. In this case, at least one of the reinforcing ribs of the first plate may be in contact with the reinforcing ribs of said second plate.

The metal skin of the first plate may have a thickness between 0.005 inches and 0.050 inches, and the reinforcing ribs of the first plate may extend about 0.715 inches from the inner surface. The instrument body may include a honeycomb material attached to the inner surface of the first plate The instrument body may also include a transducer mounted on one of the plates for electronic amplification.

In another embodiment of the invention, a stringed musical instrument body, having a metal skin with a reinforcing rib, is made by first providing a metal plate with first and second sides. A first pocket is machined from the second side of the metal plate, the pocket delineating a first section of the metal skin between a floor of the first pocket and the first side of the metal plate. A second pocket is then machined from the second side of the metal plate, the second pocket delineating a second section of the metal skin between a floor of the second pocket and the first side of the metal plate. The first and second pockets have adjacent sidewalls delineating the reinforcing rib therebetween.

The step of providing a metal plate may further include providing a metal plate of raw metal plate stock. Alternatively, that step may include providing a premolded metal plate. The machining steps may further include machining using a computer numeric controlled machine tool. The machining step may be done with a milling machine, an EDM machine or by laser machining.

The process of making a musical instrument body may further include providing a second metal plate having first and second sides and repeating the machining steps on the second metal plate. The first and second metal plates are then fastened together so that the respective second sides of the first and second plates face each other. A metal ring plate may be placed between the first and second plates.

The first and second pockets may be machined to delineate sections of the metal skin having a thickness between 0.005 inches and 0.050 inches. A metal finishing operation may be performed on the first sides of the metal plates. A honeycomb material may be attached to the metal skin in the first and second pockets.

In yet another embodiment of the invention, a stringed musical instrument body is manufactured by fastening a metal plate on a machine tool. The metal plate has first and second sides. A pocket is then machined from the second side of the metal plate, delineating a metal skin between a floor of the pocket and the first side of the metal plate. The metal skin may have a thickness of between 0.005 inches and 0.050 inches. The machine tool may be a milling machine, an EDM machine or a laser machining tool.

DETAILED DESCRIPTION OF THE INVENTION

This description will use a guitar as an example for ease of understanding but is not intended to limit the scope of the invention as this technology can be applied to any stringed instrument in use today. Dimensions are used to aid in the understanding of the principles involved and are not intended to limit the scope of the invention.

Figure 1:
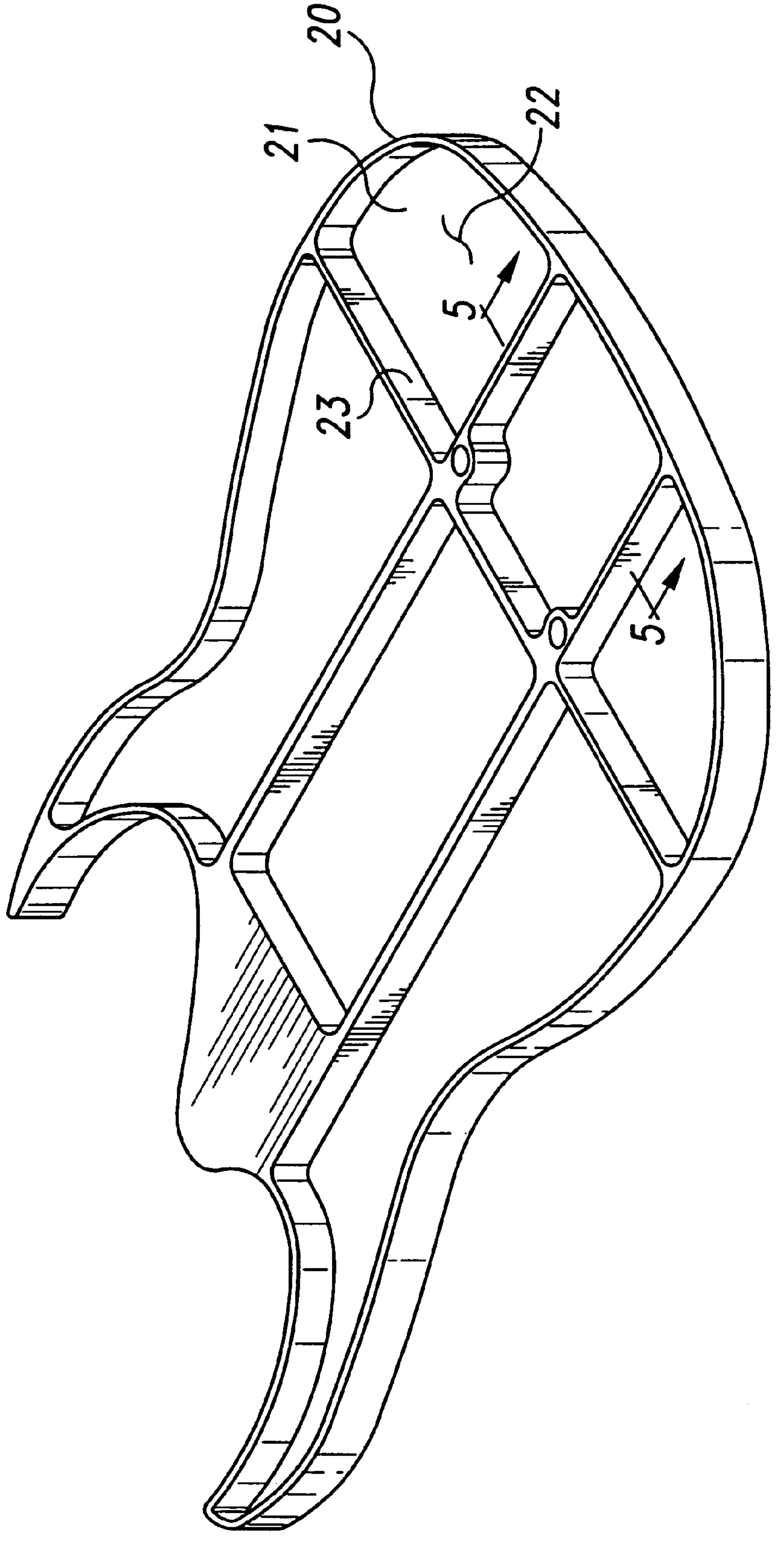
FIG. 1—Base plate of guitar body with pockets cut.
Figure 2:
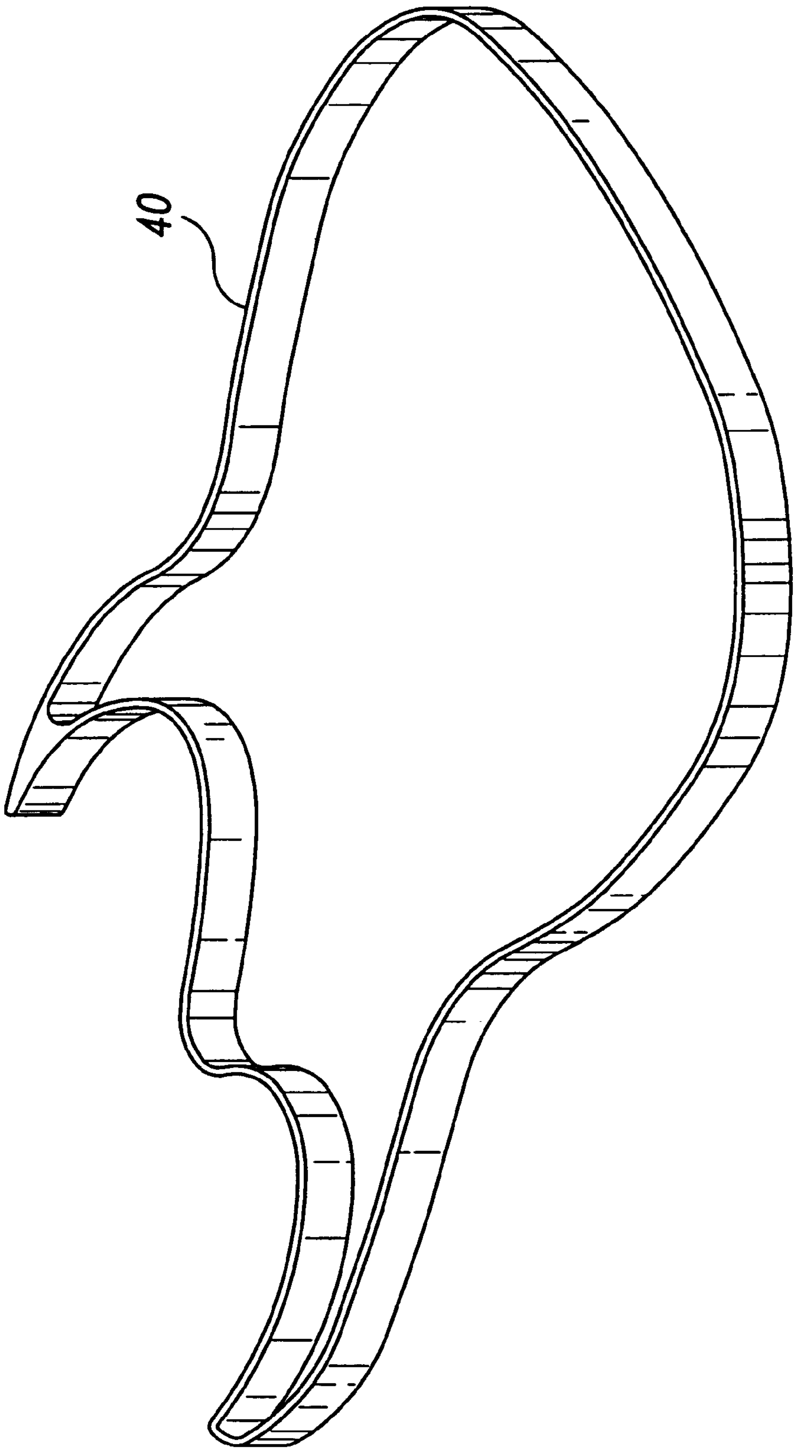
FIG. 2—Optional ring plate to allow for a thicker lightweight body.
Figure 3:
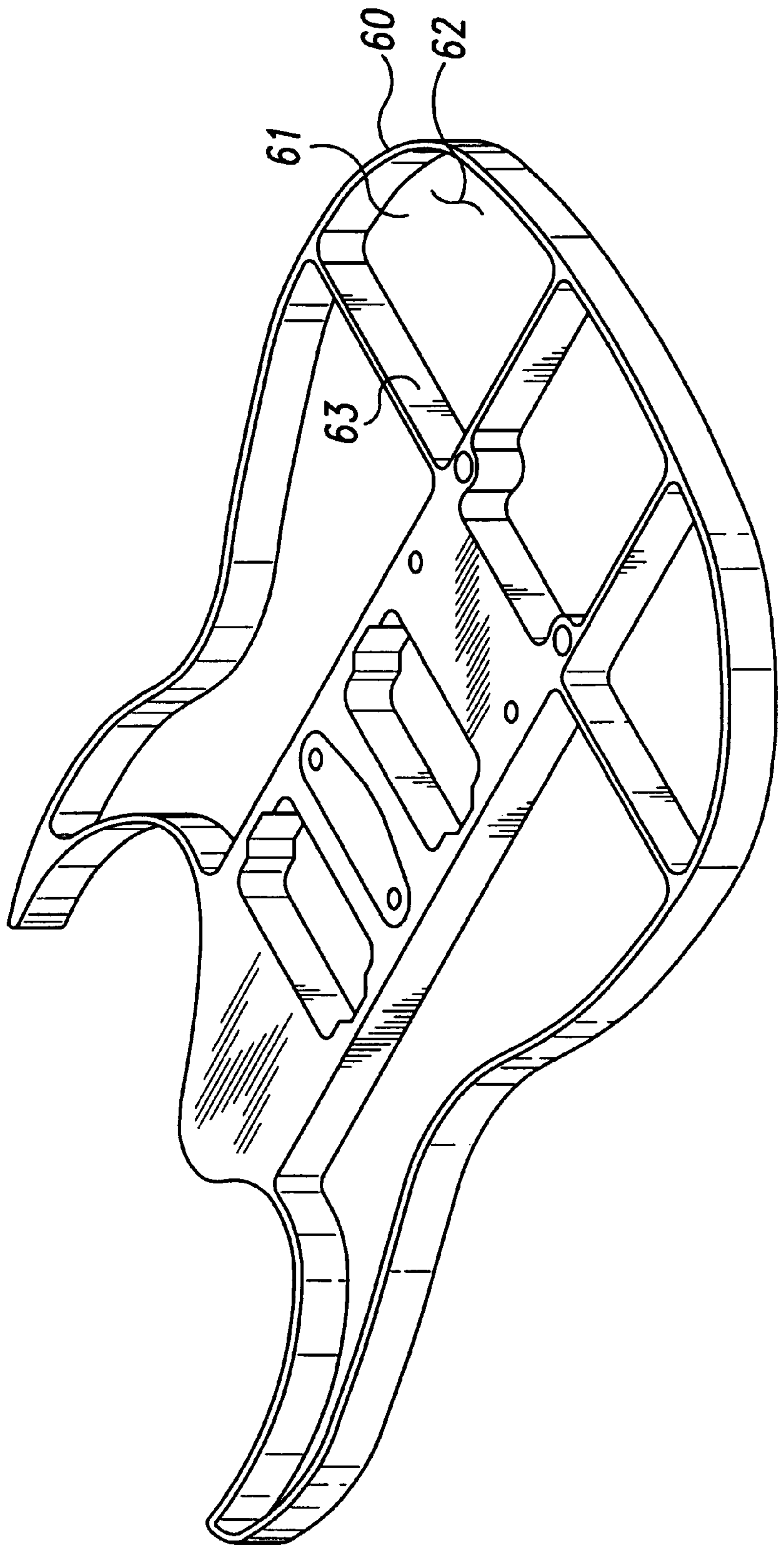
FIG. 3—Top plate of body with pockets cut.

A hollow metal guitar body 10 is constructed from two or three primary components. These include a bottom plate 20 (see FIG. 1), a top plate 60 (see FIG. 2), and an optional ring plate 40 (see FIG. 3). These components are then fastened together, pockets 21,61 facing inwards and the skin 22,62 out, using mechanical fasteners or adhesives forming a near seamless union.

The bottom and top plate 20,60 for this example was manufactured from 0.75" plate stock of 6061 aluminum. A molded part could also be used to reduce machine time and cut back on waste material. The milling operation was carried out on a Cincinnati Milicron Sabre 2000 vertical milling center. The pockets and contours were cut using a 0.5" carbide end mill. The raw stock aluminum was fastened to the mill table following standard set-up operations.

The design for the top and bottom plates 20,60 was developed using Mastercam version 7 CAD/CAM (Computer Aided Design/Computer Aided Machine) software. Tool path was written and converted to the appropriate NC software required by the Cincinnati Sabre 2000.

The program was executed following the procedure outlined in the Saber 2000 operating manual and the desired pockets and contours were cut in the raw aluminum plate. The pockets 21,61 were cut with the removal of 0.715" of material from the 0.750" stock. This left a skin 22,62 of 0.035" to act as the face of the top and bottom plates. The inner pocket ribs 23,63, with a height of ¼" and a thickness of ⅛–¼ inch, acted as reinforcing ribs to help strengthen the guitar body 10 and to enhance the sound of the body.

Figure 5:
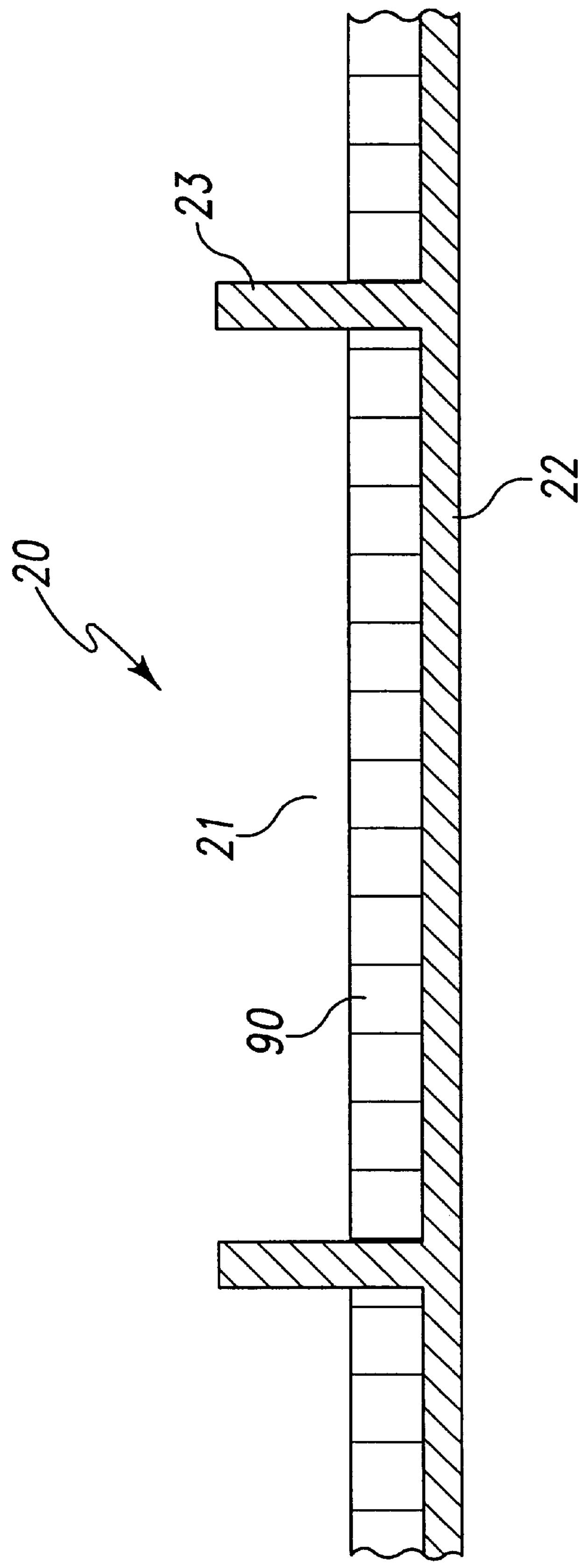
FIG. 5—Sectional view of one embodiment of the base plate through plane V—V.

Aluminum honeycomb 90(FIG. 5), ¼ cells ¼" thick, was cut to match the pocket dimensions. This honeycomb was epoxied to the inside face of the pocket 21 for added strength and to enhance the sound of the body.

Figure 4:
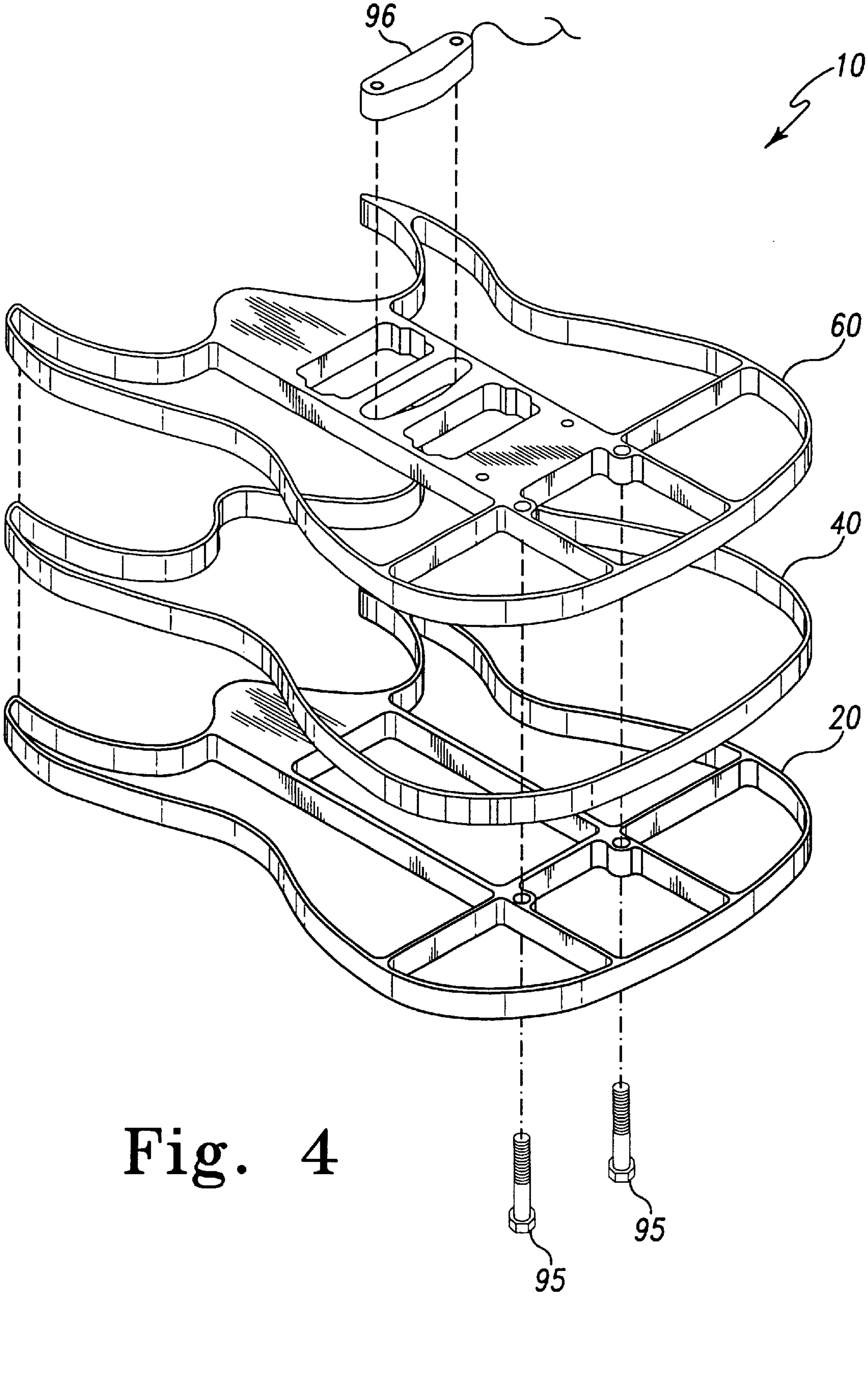
FIG. 4—Composite view of the necessary plates, optional ring plate included, as they would be fastened together.

The two plates were fastened together using ¼-20 socket head cap screws 95 (FIG. 4). A ring plate, (FIGS. 2 and 4), not used in this example, can be added between the top and bottom plates to increase the overall thickness of the body cavity to achieve desired sound characteristics. The ring plate can be constructed as a single or multi-component piece. The ring plate would be fastened between the top and bottom plates using the same bolts to hold the top and bottom plate together.

The guitar neck, strings, and corresponding hardware are added to the body using knowledge and techniques available to one skilled in the art. Amplification electronics such as a pickup-type transducer 96 were added for this example. The instrument body may be enhanced aesthetically using painting, polishing, anodizing or plating technologies traditionally known in the art of metal finishing.

What is claimed is:

1. A method of manufacturing a stringed musical instrument body having a metal skin with a reinforcing rib, comprising the steps of:

providing a metal plate with first and second sides;

machining by removing metal to create a first pocket from the second side of the metal plate, the pocket delineating a first section of the metal skin between a floor of the first pocket and the first side of the metal plate; and machining a second pocket from the second side of the metal plate, the second pocket delineating a second section of the metal skin between a floor of the second pocket and the first side of the metal plate; the first and second pockets having adjacent sidewalls delineating the reinforcing rib therebetween.

2. The method as claimed in claim 1, wherein said step of providing a metal plate further comprises providing a metal plate of raw metal plate stock.

3. The method as claimed in claim 1, wherein said step of providing a metal plate further comprises providing a pre-molded metal plate.

4. The method as claimed in claim 1, wherein said machining steps further comprise machining using a computer numeric controlled machine tool.

5. The method as claimed in claim 1, wherein said machining steps further comprise machining using a milling machine.

6. The method as claimed in claim 1, wherein said machining steps further comprise machining using an EDM machine.

7. The method as claimed in claim 1, wherein said machining steps further comprise machining using laser machining.

8. The method as claimed in claim 1, further comprising the steps of:

providing a second metal plate having first and second sides;

repeating said machining steps on said second metal plate; and fastening the first and second metal plates together so that the respective second sides of the first and second plates face each other.

9. The method as claimed in claim 8, further comprising the step of placing a metal ring plate between the first and second plates.

10. The method as claimed in claim 1, wherein said first and second pockets are machined to delineate sections of the metal skin having a thickness between 0.005 inches and 0.050 inches.

11. The method as claimed in claim 1, further comprising the step of performing a metal finishing operation on the first side of the metal plate.

12. The method as claimed in claim 1, further comprising the step of attaching a honeycomb material to the metal skin in the first and second pockets.

13. A method of manufacturing a stringed musical instrument body having a metal skin forming a face of the body, comprising the steps of:

fastening to a machine tool a metal plate with first and second surfaces; and machining by removing metal to create a pocket in the second surface of the metal plate, the pocket delineating the metal skin between a floor of the pocket and the first surface of the metal plate.

14. The method as claimed in claim 13, wherein the metal skin has a thickness of between 0.005 inches and 0.050 inches.

15. The method as claimed in claim 13, wherein the machine tool is a milling machine.

16. The method as claimed in claim 13, wherein the machine tool is an EDM machine.

17. The method as claimed in claim 13, wherein the machine tool is a laser machining tool.

* * * * *